(12) United States Patent
Yoon et al.

(10) Patent No.: US 11,523,398 B2
(45) Date of Patent: Dec. 6, 2022

(54) METHOD AND APPARATUS FOR DETECTING DOWNLINK TRANSMISSION IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Suyoung Park, Suwon-si (KR); Euichang Jung, Suwon-si (KR); Sunghyuk Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 16/967,900

(22) PCT Filed: Feb. 11, 2019

(86) PCT No.: PCT/KR2019/001634
§ 371 (c)(1),
(2) Date: Aug. 6, 2020

(87) PCT Pub. No.: WO2019/190047
PCT Pub. Date: Oct. 3, 2019

(65) Prior Publication Data
US 2021/0029709 A1 Jan. 28, 2021

(30) Foreign Application Priority Data
Mar. 26, 2018 (KR) .................. 10-2018-0034379

(51) Int. Cl.
*H04W 72/04* (2009.01)
*H04L 5/14* (2006.01)

(52) U.S. Cl.
CPC ....... *H04W 72/0493* (2013.01); *H04L 5/1469* (2013.01); *H04W 72/042* (2013.01); *H04W 72/0453* (2013.01)

(58) Field of Classification Search
CPC .............. H04L 5/1469; H04W 72/042; H04W 72/0453; H04W 72/0493
See application file for complete search history.

(56) References Cited

U.S. PATENT DOCUMENTS 9,479,301 B2 * 10/2016 Papasakellariou .... H04L 5/0092
9,794,015 B2   10/2017 Tabet et al.
(Continued)

FOREIGN PATENT DOCUMENTS

CN  104769871 A  *  7/2015  ........... H04L 5/0044
CN  104769871 B  *  2/2018  ........... H04L 5/0044
(Continued)

OTHER PUBLICATIONS

Kim et al., Dynamic PDCCH Adaptation Based on DMRS Detection for UE Power Saving in 5G New Radio, Sep. 22, 2019, 2019 IEEE 90th Vehicular Technology Conference (VTC2019-Fall), 2019, pp. 1-2, doi: 10.1109/VTCFall.2019.8891206 (Year: 2019).*
(Continued)

*Primary Examiner* — Eric Nowlin
(74) *Attorney, Agent, or Firm* — Nixon & Vanderhye P.C.

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (for example, smart homes, smart buildings, smart cities, smart or connected cars, health care, digital education, retail business, and services associated with security and safety) on the basis of 5G communication technology and IoT-related technology. The present disclosure relates to a method and an apparatus for detecting downlink transmission in an unlicensed band.

15 Claims, 12 Drawing Sheets

(56) References Cited

U.S. PATENT DOCUMENTS

| | | | |
|---|---|---|---|
| 10,021,715 B2 * | 7/2018 | Papasakellariou | H04W 72/1273 |
| 10,959,197 B2 * | 3/2021 | Ng | H04W 48/12 |
| 11,147,051 B2 * | 10/2021 | Kwak | H04L 5/0094 |
| 2013/0083753 A1 | 4/2013 | Lee et al. | |
| 2014/0071915 A1 * | 3/2014 | Papasakellariou | H04L 5/0092 370/329 |
| 2014/0071935 A1 * | 3/2014 | Papasakellariou | H04W 72/1273 370/330 |
| 2015/0365880 A1 * | 12/2015 | Malladi | H04L 5/0007 370/312 |
| 2016/0073366 A1 * | 3/2016 | Ng | H04W 16/14 370/329 |
| 2017/0164395 A1 * | 6/2017 | Papasakellariou | H04W 72/1273 |
| 2018/0049169 A1 | 2/2018 | Lin et al. | |
| 2018/0317092 A1 * | 11/2018 | Harada | H04L 27/0006 |
| 2019/0069218 A1 * | 2/2019 | Ribeiro | H04W 48/12 |
| 2019/0268883 A1 * | 8/2019 | Zhang | H04L 5/0094 |
| 2019/0334677 A1 * | 10/2019 | Hwang | H04L 5/0082 |
| 2019/0349904 A1 * | 11/2019 | Kwak | H04L 5/0048 |
| 2020/0322932 A1 | 10/2020 | Kim et al. | |
| 2020/0359391 A1 * | 11/2020 | Baldemair | H04W 72/12 |
| 2020/0396686 A1 * | 12/2020 | Tiirola | H04W 52/02 |
| 2021/0195569 A1 * | 6/2021 | Horiuchi | H04W 72/044 |
| 2022/0022175 A1 * | 1/2022 | Kwak | H04L 25/0238 |

FOREIGN PATENT DOCUMENTS

| | | | | |
|---|---|---|---|---|
| CN | 107959562 A | * | 4/2018 | H04L 5/0044 |
| CN | 110149661 A | * | 8/2019 | H04L 1/18 |
| CN | 111699721 A | * | 9/2020 | H04W 52/0229 |
| CN | 107959562 B | * | 12/2020 | H04L 5/0044 |
| CN | 110149661 B | * | 6/2022 | H04L 1/18 |
| EP | 3 706 356 | | 9/2020 | |
| JP | 2021514151 A | * | 2/2018 | |
| KR | 102161060 B1 | * | 9/2013 | |
| KR | 20150067181 A | * | 9/2013 | |
| KR | 10-2014-0071480 | | 6/2014 | |
| KR | 10-2018-0018438 | | 2/2018 | |
| WO | WO-2018145019 A1 | * | 8/2018 | H04L 25/0238 |
| WO | WO-2019098893 A1 | * | 5/2019 | H04L 1/0067 |
| WO | WO-2019158013 A1 | * | 8/2019 | H04L 1/18 |

OTHER PUBLICATIONS

International Search Report for PCT/KR2019/001634 dated May 8, 2019, 4 pages.

Written Opinion of the ISA for PCT/KR2019/001634 dated May 8, 2019, 6 pages.

LG Electronics, "Potential solutions for NR unlicensed operation", R1-1802239, 3GPP TSG RAN WG1 Meeting #92, Feb. 16, 2018, 10 pages.

LG Electronics, "Text proposals on multiplexing for CSI-RS", R1-1800366, 3GPP TSG RAN WG1 Meeting AH 1801, Jan. 13, 2018, 5 pages.

Qualcomm Incorporated, "On multiplexing of different types of RSs", Rl-1720666, 3GPP TSG RAN WG1 Meeting 91, Nov. 18, 2017, 6 pages.

Zte et al., "Remaining details on CSI-RS," R1-1800113, 3GPP TSG RAN WG1 Meeting AH 1801, Jan. 13, 2018, 8 pages.

Intel Corporation, "On the additional downlink starting positions in a subframe for FS3," R1-1717325, 3GPP TSG RAN WG1 Meeting 90bis, Oct. 13, 2017, 4 pages.

Extended Search Report dated Feb. 17, 2021 in counterpart European Patent Application No. 19776924.3.

Vivo: "Remaining details on PDCCH structure", 3GPP TSG RAN WG1 Meeting #92; R1-1801530; Athens, Greece Feb. 26, 2018-Mar. 2, 2018 Feb. 15, 2018, XP051396782 (4 pages).

Samsung: "Potential physical layer procedures for NR-U", 3GPP TSG RAN WG1 Meeting #92; R1-1804405; Sanya, China; Apr. 16, 2018-Apr. 20, 2018 Apr. 6, 2018, XP051413275 (7 pages).

Decision of Patent dated Oct. 4, 2022 in Korean Patent Application No. 10-2018-0034379 and English-language translation, 9 pages.

* cited by examiner

METHOD AND APPARATUS FOR DETECTING DOWNLINK TRANSMISSION IN WIRELESS COMMUNICATION SYSTEM

This application is the U.S. national phase of International Application No. PCT/KR2019/001634 filed Feb. 11, 2019 which designated the U.S. and claims priority to KR Patent Application No. 10-2018-0034379 filed Mar. 26, 2018, the entire contents of each of which are hereby incorporated by reference.

TECHNICAL FIELD

The disclosure relates to a 5G wireless communication, which is also known as/called next generation wireless communication. More particularly, the disclosure relates to a method and an apparatus for detecting a downlink transmission by a terminal in an unlicensed band.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, for cellular communication utilizing an unlicensed band, 3GPP standardizes communication-related matters in an unlicensed band. Specifically, standardization work has been or is in progress for AUL transmission (further enhanced LAA (FeLAA)), while performing downlink transmission in an unlicensed band (licensed assisted access (LAA)) in 3GPP LTE/LTE-A Rel.13, performing uplink transmission in an unlicensed band (enhanced LAA (eLAA)) in Rel.14, and diversifying the start/end time of transmission in the unlicensed band in Rel.15.

In the unlicensed band, transmission is possible only when the channel (or medium) is idle. That is, in the licensed band, the terminal may assume that there is always downlink transmission of the base station, but since there may or might not be transmission in the unlicensed band, a method for the terminal to determine this is necessary.

DISCLOSURE OF INVENTION

Technical Problem

Meanwhile, in a legacy LTE/LTE-A communication system, when downlink transmission in an unlicensed band, a terminal supporting downlink reception in an unlicensed band can determine whether there is downlink transmission by utilizing cell specific reference Signal (CRS) transmitted from a base station. FIG. 1 illustrates a CRS transmission pattern when the number of antenna ports is 1 or 2 in LTE/LTE-A, and FIG. 2 illustrates a process in which the UE determines whether to transmit downlink using the CRS of FIG. 1.

The terminal operating in the unlicensed band may first perform an operation of detecting the CRS of the serving cell (210), and determine whether there is downlink transmission in the subframe in which the CRS is detected according to whether the CRS is detected (220). If CRS is detected, the terminal determines that there is downlink transmission from the base station and receives and processes the downlink signal (240). On the other hand, if CRS is not detected, the terminal may determine that there is no downlink transmission from the base station in the corresponding subframe, and can reduce power consumption by not performing additional processing (e.g., PDCCH monitoring) (230).

However, it was decided not to introduce always on signal such as LTE/LTE-A CRS in 5G. Therefore, in a 5G communication system, which is also known/called new radio (NR), it is impossible to determine 5G downlink transmission in an unlicensed band through the method described in FIGS. 1 and 2. Accordingly, if the terminal cannot determine whether there is downlink transmission from the 5G base station, a subsequent operation is always performed, which may cause a problem of increasing power consumption.

Accordingly, the disclosure is to provide a method and apparatus for determining whether a terminal operating in an unlicensed band of a 5G communication system determines downlink transmission in order to solve the above-described problem. The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

A method of a terminal according to an embodiment of the disclosure for solving the above-described problems includes: receiving configuration information related to a reference signal for determining whether to transmit downlink in an unlicensed band; detecting the reference signal on at least one resource element (RE) identified based on the configuration information; and processing a downlink signal received from a control resource set (CORESET) corresponding to the reference signal when the reference signal is detected.

A terminal according to another embodiment of the disclosure for solving the above-described problems includes: a transceiver configured to transmit and receive a signal; and a controller configured to receive configuration information related to a reference signal for determining whether to transmit downlink in an unlicensed band, detect the reference signal on at least one resource element (RE) identified based on the configuration information, and process a downlink signal received from a control resource set (CORESET) corresponding to the reference signal when the reference signal is detected.

A method of a base station according to another embodiment of the disclosure for solving the above-described problems includes: transmitting configuration information related to a reference signal for determining whether to transmit downlink in an unlicensed band to a terminal; and transmitting the reference signal to the terminal on at least one resource element (RE) identified based on the configuration information, wherein the terminal receiving the reference signal processes a downlink signal received from a control resource set (CORESET) corresponding to the reference signal.

A base station according to another embodiment of the disclosure for solving the above-described problems includes: a transceiver configured to transmit and receive a signal; and a controller configured to transmit configuration information related to a reference signal for determining whether to transmit downlink in an unlicensed band to a terminal, and transmit the reference signal to the terminal on at least one resource element (RE) identified based on the configuration information, wherein the terminal receiving the reference signal processes a downlink signal received from a control resource set (CORESET) corresponding to the reference signal.

Advantageous Effects of Invention

According to an embodiment of the disclosure, in performing communication using an unlicensed band of a 5G communication system, the terminal can detect whether a downlink is transmitted from the base station, thereby reducing power consumption of the terminal performing unnecessary operations.

MODE FOR THE INVENTION

Figure 1:
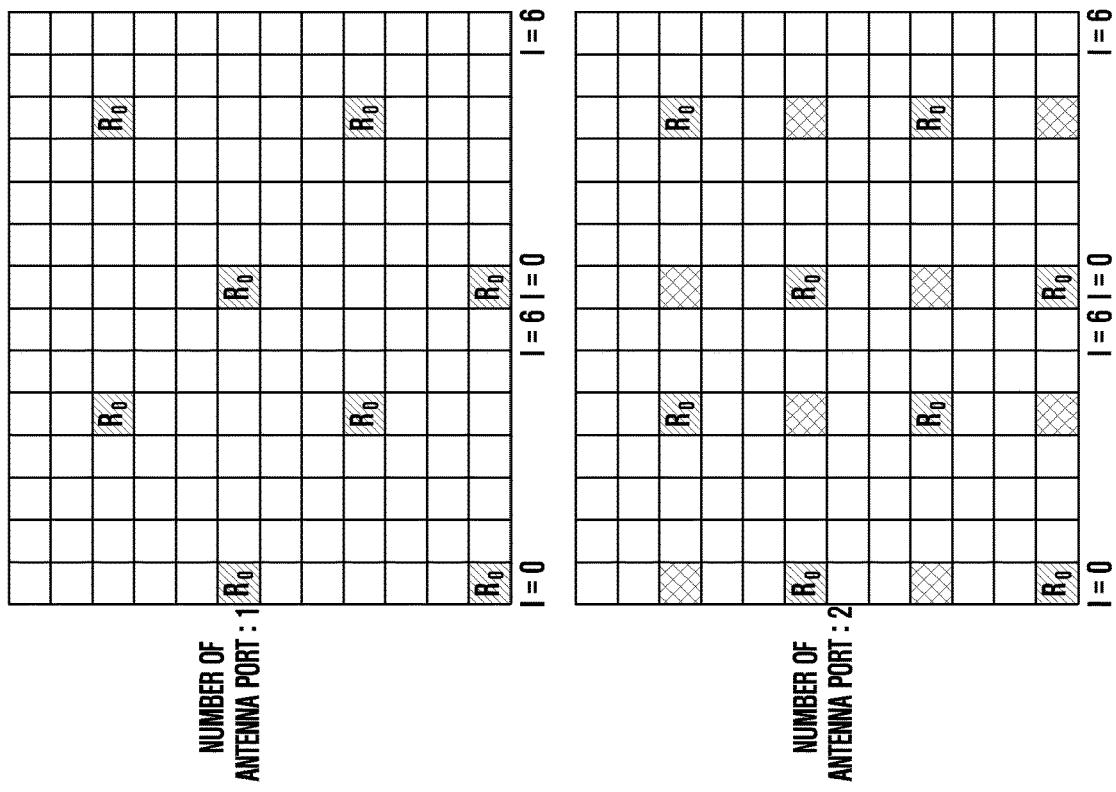
FIG. 1 illustrates a CRS transmission pattern when the number of antenna ports is 1 or 2 in LTE/LTE-A.
Figure 2:
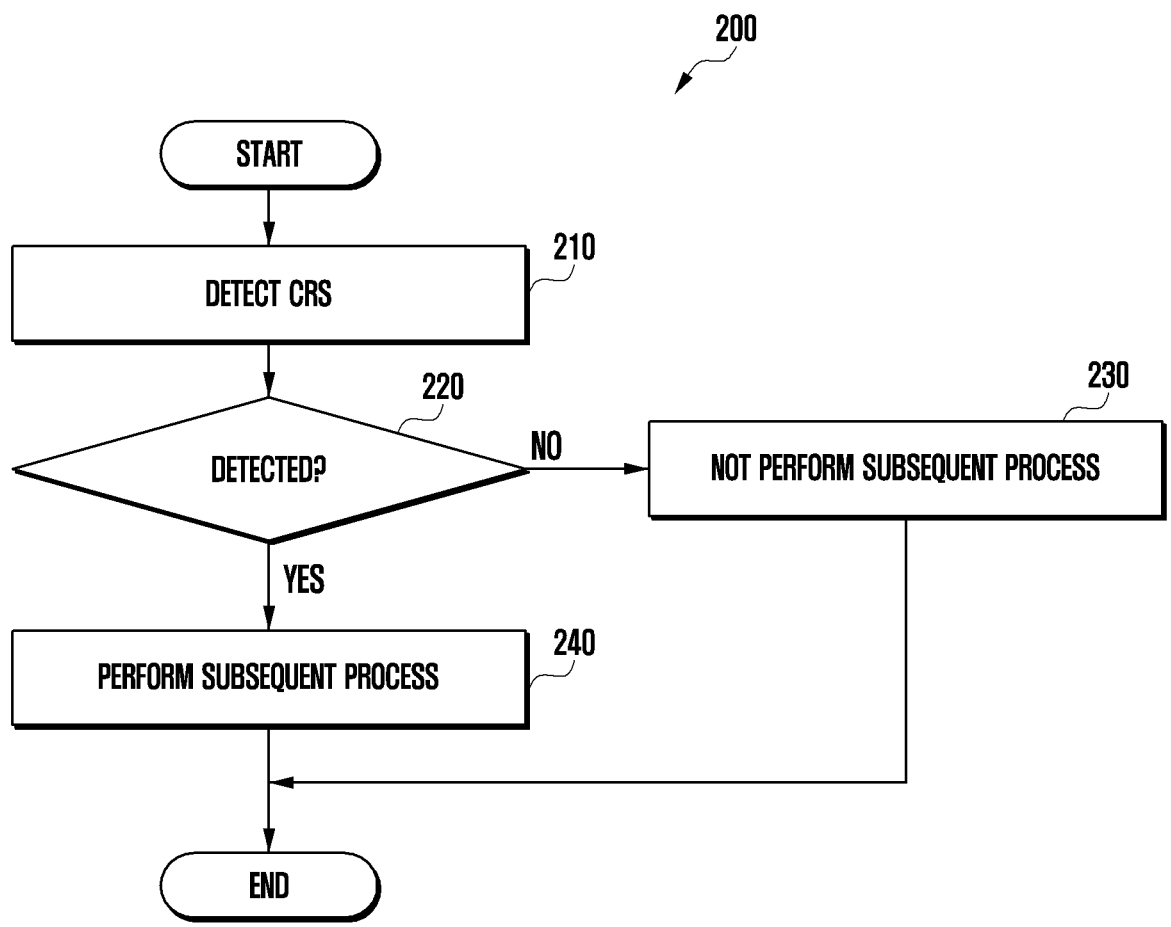
FIG. 2 illustrates a process in which the terminal determines whether to transmit downlink using the CRS.

Hereinafter, exemplary embodiments of the disclosure will be described in detail in conjunction with the accompanying drawings. In the accompanying drawings, it will be noted that identical elements are designated by identical reference signs as much as possible. Further, a detailed description of known functions or configurations incorporated herein, which may make the subject matter of the disclosure unclear, will be omitted.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, an embodiment for determining whether a terminal operating in an unlicensed band of a 5G communication system determines downlink transmission from a base station will be described with reference to the drawings.

In a 5G communication system, a CORESET and a search space for a terminal to monitor a physical downlink control channel (PDCCH) may be configured. The CORESET and the search space may be specifically configured by the base station. CORESET may have 1, 2, or 3 OFDM symbol lengths on the time axis, and the lengths on the time axis of the CORESET may be configured for the terminal through UE-specific radio resource control (RRC) signaling. In addition, CORESET may be configured in a plurality of resource block (RB) units on the frequency axis, and the length on the frequency axis may be configured for the terminal through RRC signaling in a bitmap manner. At this time, as the CORESET is configured to be specific to the terminal, the first symbol position of the CORESET in the slot may be indicated to the terminal.

The search space set defined for CORESET may be configured by parameters shown in Table 1 below. As shown in Table 1 below, the specific search space set may be configured by one or more of various parameters such as what CORESET corresponds to a specific search space set (that is, linked), whether the corresponding search space set is a common search space set or a UE-specific search space set, the monitoring cycle of the search space set, monitoring offset, and monitoring pattern in the slot.

TABLE 1

| Parameter | Contents |
| --- | --- |
| CORESET index | Indicate related CORESET |
| Common-search-space-flag | Indicate whether search space set is common search space set or UE-specific search space set |
| Aggregation-level-x | PDCCH candidate number (0, 1, 2, 3, 4, 5, 6, 7, 8) of aggregation level x (1, 2, 4, 8, 16) |
| Monitoring-periodicity-PDCCH-slot | PDCCH monitoring cycle, $k_p$ |
| Monitoring-offset-PDCCH-slot | PDCCH monitoring offset, $o_p$ ($0 \leq o_p < k_p$) |
| Monitoring-symbols-PDCCH-within-slot | Indicate PDCCH monitoring pattern in slot, position on time domain of CORESET in slot |

Figure 3:
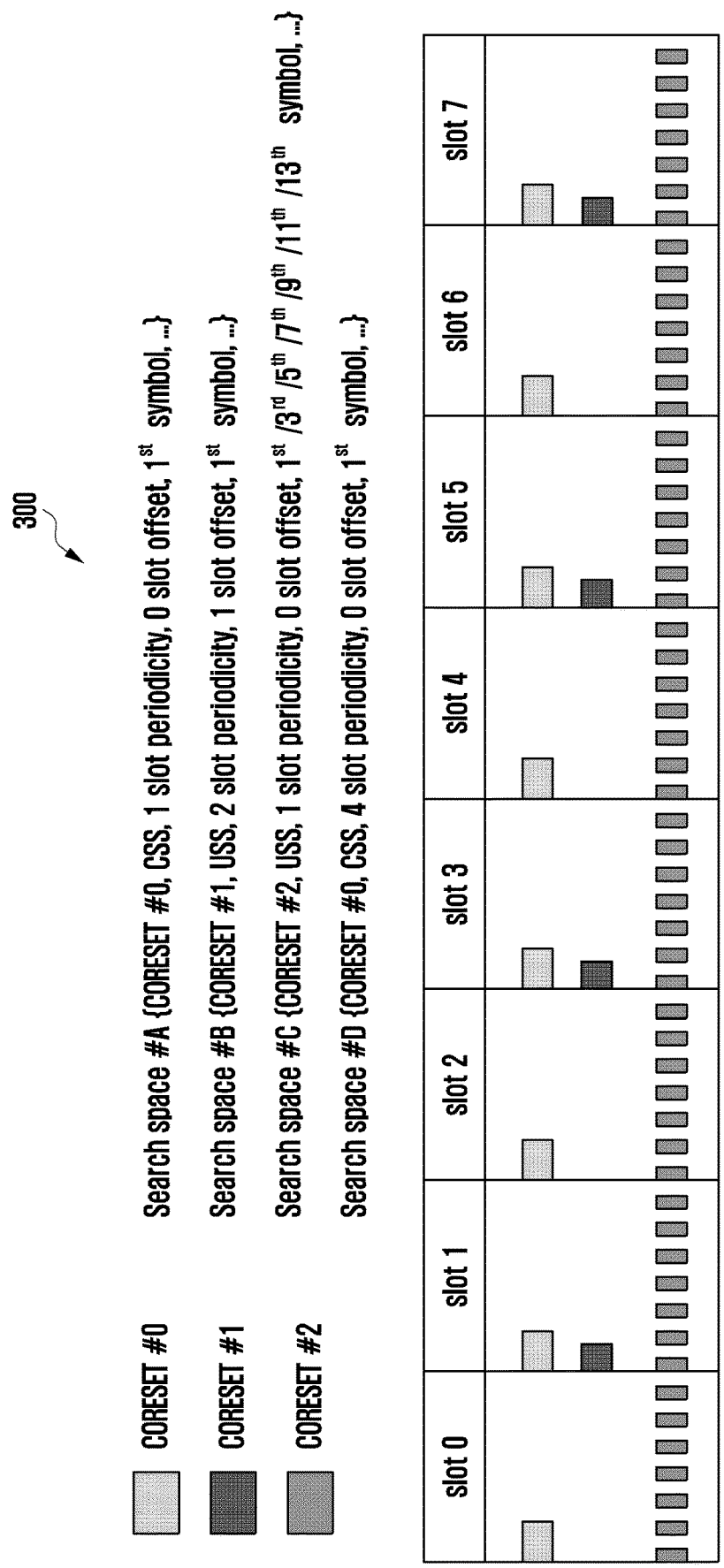
FIG. 3 is a view illustrating an example of a control resource set (CORESET) and a search space setting in a 5G communication system.

FIG. 3 is a view illustrating an example of a control resource set (CORESET) and a search space configuration in a 5G communication system. In FIG. 3, CORESET #0 310 is defined in three OFDM symbol periods, CORESET #1 320 is defined in two OFDM symbol periods, and CORESET #2 330 is defined in one OFDM symbol period. Also, the search space set #A is a common search space set associated with CORESET #0 and is configured for each slot, and is configured to exist from the first OFDM symbol of each slot. The search space set #B is a terminal-specific search space set associated with CORESET #1, has two slot periods and one slot offset, and is configured to exist from the first OFDM symbol of every slot. The search space set #C is a terminal-specific search space set associated with CORESET #2 and is configured for each slot, and is configured to exist in 1st, 3rd, 5th, 7th, 9th, 11th, and 13th OFDM symbols of each slot. The search space set #D is a common search space set associated with CORESET #0, has 4 slot periods and 0 slot offsets, and is present in the first OFDM symbol of each slot. That is, the search space corresponding to CORESET and CORESET within the entire system bandwidth may be defined on time/frequency resources by various parameters configured for the terminal.

Figure 4:
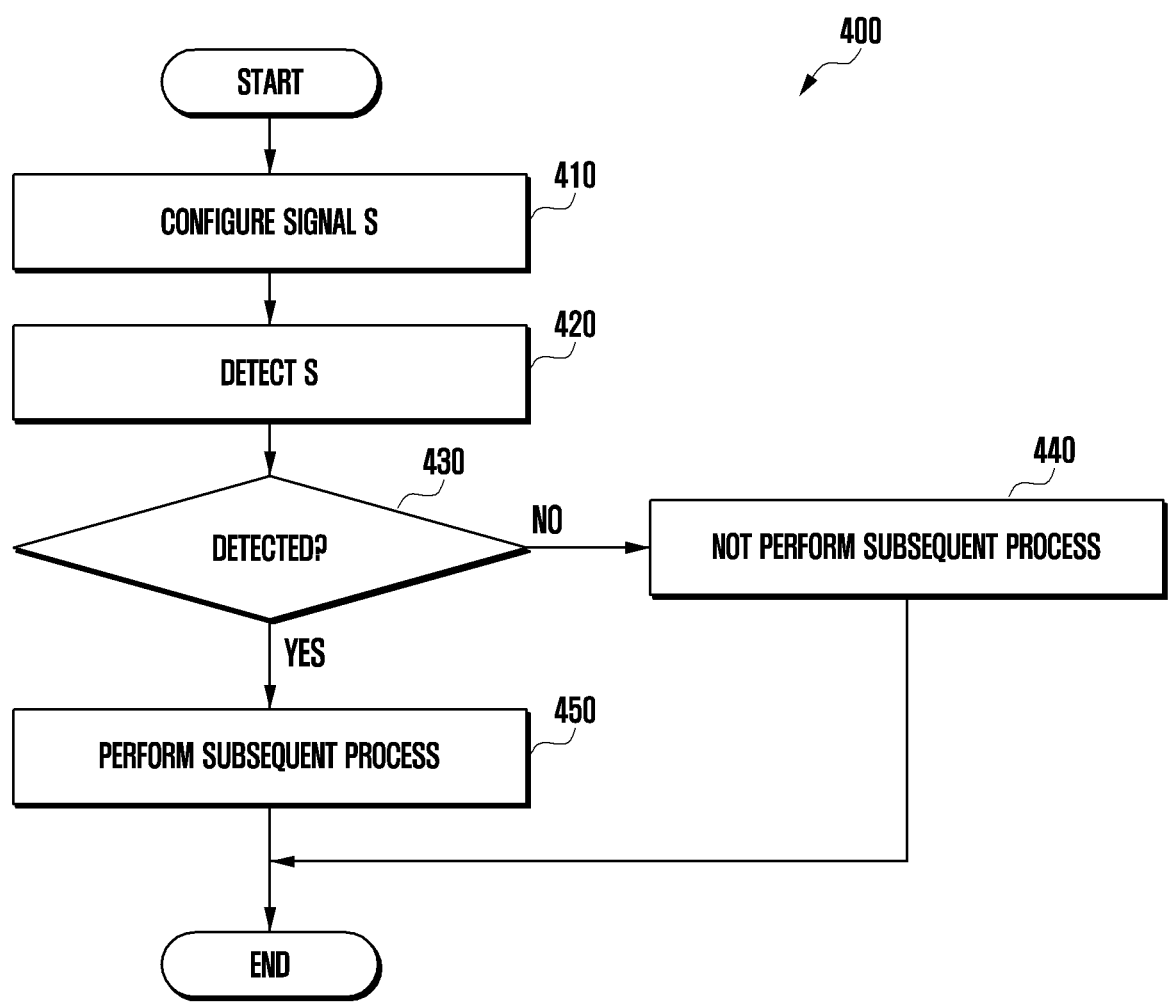
FIG. 4 is a flowchart illustrating a method for detecting whether a user equipment transmits downlink in a 5G communication system according to a proposed embodiment.

FIG. 4 is a flowchart illustrating a method for detecting whether a user equipment transmits downlink in a 5G communication system according to a proposed embodiment.

Meanwhile, hereinafter, an embodiment of setting a predetermined signal s in connection with the above-described CORESET is proposed. In the 5G communication system, it is possible to configure a terminal to transmit a signal by linking a specific signal to a corresponding CORESET (410). When configured as described above, when the channel is detected to be idle by performing a channel access procedure (CAP) or a listen before talk (LBT) procedure in an unlicensed band, the base station may map the PDCCH to a specific search space of a set of search spaces linked to a CORESET and multiplex the signal s described above to transmit the same to the terminal on predetermined resource elements (REs). Since the transmission/reception is not performed when the channel is not idle in the unlicensed band, the terminal operating in the unlicensed band may first detect the signal s described above (420), and determine whether downlink transmission is performed by the base station according to whether the corresponding signal is detected.

Specifically, when the terminal determines that the signal s has been received from the base station, the terminal determines that there is a downlink transmission and receives and processes the downlink signal transmitted from CORESET (430, 450). On the other hand, if the signal s is not detected from the base station, the terminal may reduce power consumption by determining that there is no downlink transmission and stopping without performing a subsequent procedure (430, 440).

Figure 5:
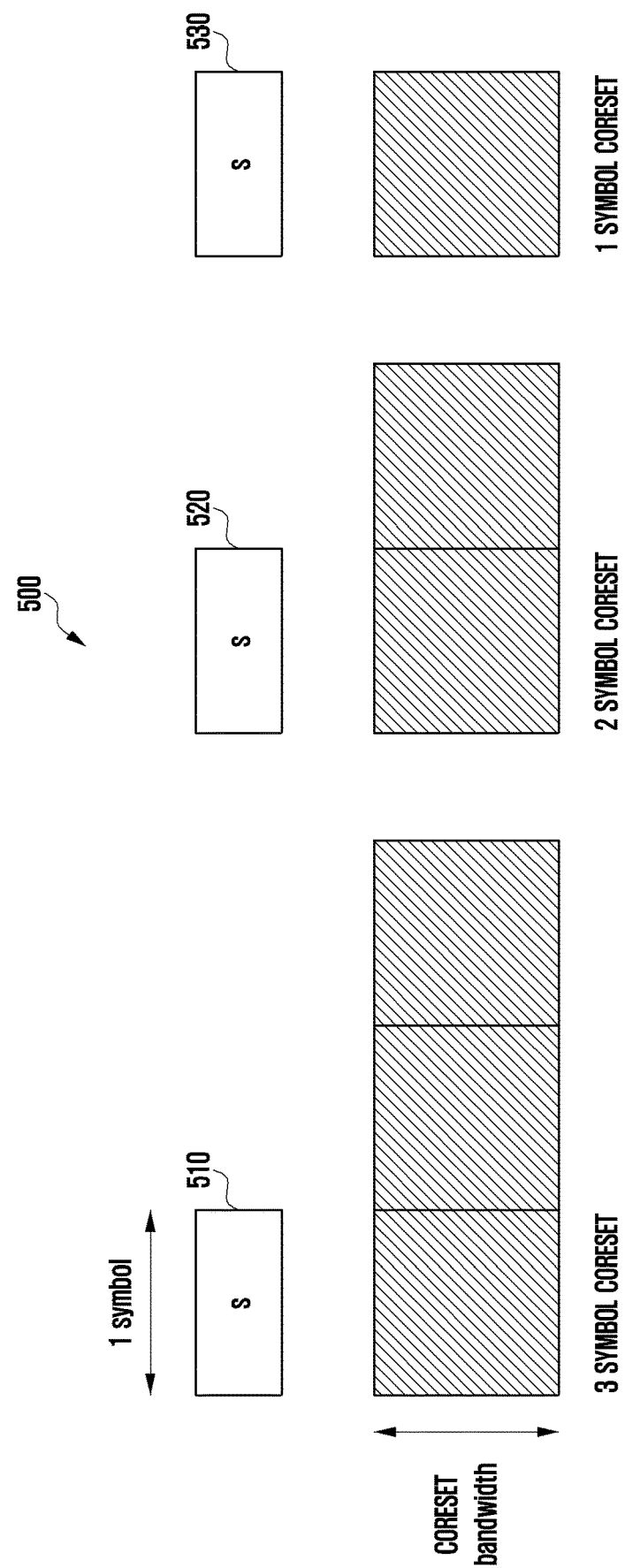
FIG. 5 is a view illustrating an embodiment in which a CORESET and a signal s are frequency division multiplexing (FDM) according to the proposed embodiment.

FIG. 5 is a view illustrating an embodiment in which a CORESET and a signal s are frequency division multiplexing (FDM) according to the proposed embodiment.

As described above, CORESET can be defined across 1, 2 or 3 OFDM symbols. According to an embodiment, signals s associated with CORESET and CORESET may be multiplexed (i.e., FDM) on a frequency axis and transmitted. At this time, the signal s may be multiplexed on the first OFDM symbol and frequency axis of CORESET. For example, in the case shown in FIG. 5, when CORESET is defined over 3 OFDM symbols, the signal s is FDM with the first OFDM symbol of 3 OFDM symbols (510), when CORESET is defined over 2 OFDM symbols, the signal s is with the first OFDM symbol of the 2 OFDM symbols (520), and when CORESET is defined over one OFDM, the signal s may be FDM with the corresponding OFDM symbol (530).

Unlike the embodiment shown in FIG. 5, the signal s may be transmitted to the terminal through TDM with CORESET. For example, the signal s may be multiplexed on one or more OFDM symbols in which CORESET is defined (i.e., time division multiplexing) and transmitted. In this case, the signal s may be transmitted on an OFDM symbol that is earlier on the time axis than the CORESET, and may be transmitted to a terminal at a position on a specific frequency axis within the CORESET bandwidth.

Figure 6:
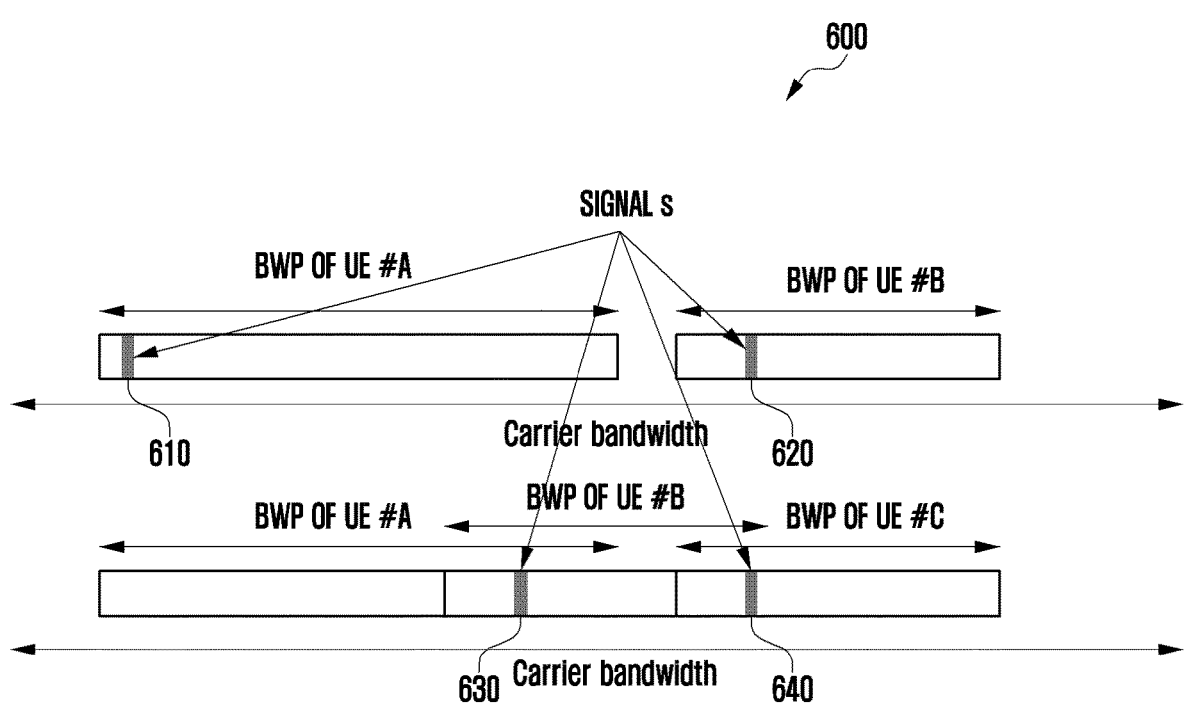
FIG. 6 is a view illustrating an example in which a signal s is configured in a bandwidth part (BWP) according to the proposed embodiment.

FIG. 6 is a view illustrating an example in which a signal s is configured in a bandwidth part (BWP) according to the proposed embodiment. In a 5G communication system, since the BWP can be configured in several RB units within the entire system frequency axis, and transmission and reception are performed only within the configured BWP, the terminal monitors only the BWP configured for itself. Since the BWP configuration is terminal-specific, the BWP configured for each terminal may exist independently in a frequency band supported by the base station. An embodiment in which the BWP of the terminal A and the BWP of the terminal B do not overlap is shown in the upper part of FIG. 6, and an embodiment in which the BWPs of the terminal A and the terminal B partially overlap, and the BWPs of the terminal B and the terminal C partially overlap is shown in the lower part of FIG. 6.

According to an embodiment, the position on the frequency axis where the signal s is transmitted may be configured within the BWP of a specific terminal among the entire system band. Since the terminal transmits and receives only in the BWP and only the BWP is monitored, so the signal s for notifying that there is downlink transmission needs to be transmitted in the BWP configured for the terminal. In the case of the embodiment shown at the upper part of FIG. 6, the signal s is configured and transmitted for each BWP of the terminals A and B (610, 620), and in the case of the embodiment shown at the lower part of FIG. 6, the signal s is configured and transmitted in overlapping periods for both terminals (630, 640). When the signal s is transmitted in the overlapping periods for the terminals A and B (630), since both the terminal A and the terminal B can detect the corresponding signal s, it can be seen that there is downlink transmission from the serving cell. Meanwhile, the signal s may have cell-specific characteristics, and a detailed description of the signal s will be described later.

The base station may configure the signal s to the terminal by transmitting a parameter related to the signal s to the terminal through higher layer signaling (e.g., RRC signaling). The signal s may be configured to be terminal-specific or cell-specific, and the base station may explicitly transmit the configuration for signal s to the terminal, or the terminal may implicitly recognize the configuration for signal s. In the latter case, the terminal may determine that the signal s exists in association with a specific CORESET from signaling transmitted by the base station. The explicit configuration or the implicit configuration may include information on a parameter indicating the position on the frequency axis where the signal s is transmitted, and the position on the frequency axis may be BWP-specific. According to an embodiment, information indicating the location on the frequency axis of the signal s may be added to the parameter for setting the BWP and transmitted together, and it is also possible that the frequency axis positions of the BWP and the signal s are linked to each other through a method in which the id of the BWP configuration is added to the configuration of the signal s.

Figure 7:
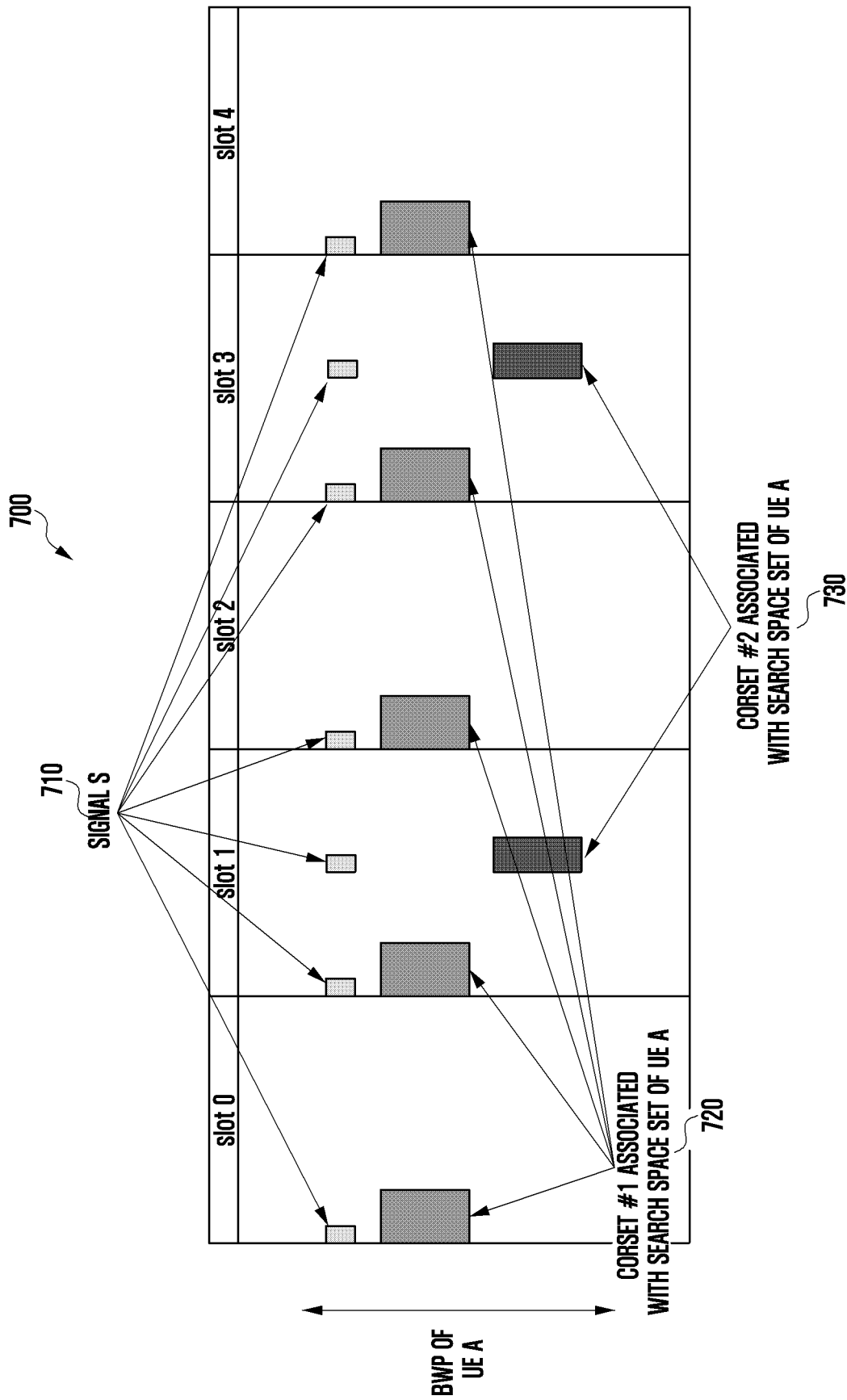
FIG. 7 is a view illustrating an example in which the signal s is configured according to the proposed embodiment.

FIG. 7 is a view illustrating an example in which the signal s is configured according to the proposed embodiment. According to the above-described embodiment, the base station may configure the signal s 710 BWP specifically for each BWP configured for the terminal. For example, CORESET #1 720 and CORESET #2 730 associated with the set of search spaces of terminal A are defined in the BWP configured for the terminal, and the signal s 710 may be transmitted in the BWP in association with CORESET 710. FIG. 7 illustrates an embodiment in which the signal s is FDM with CORESET #1 720 and CORESET #2 730 and is transmitted on specific REs in each first OFDM symbol of CORESET, but may be transmitted in a TDM manner, as described above.

Figure 8:
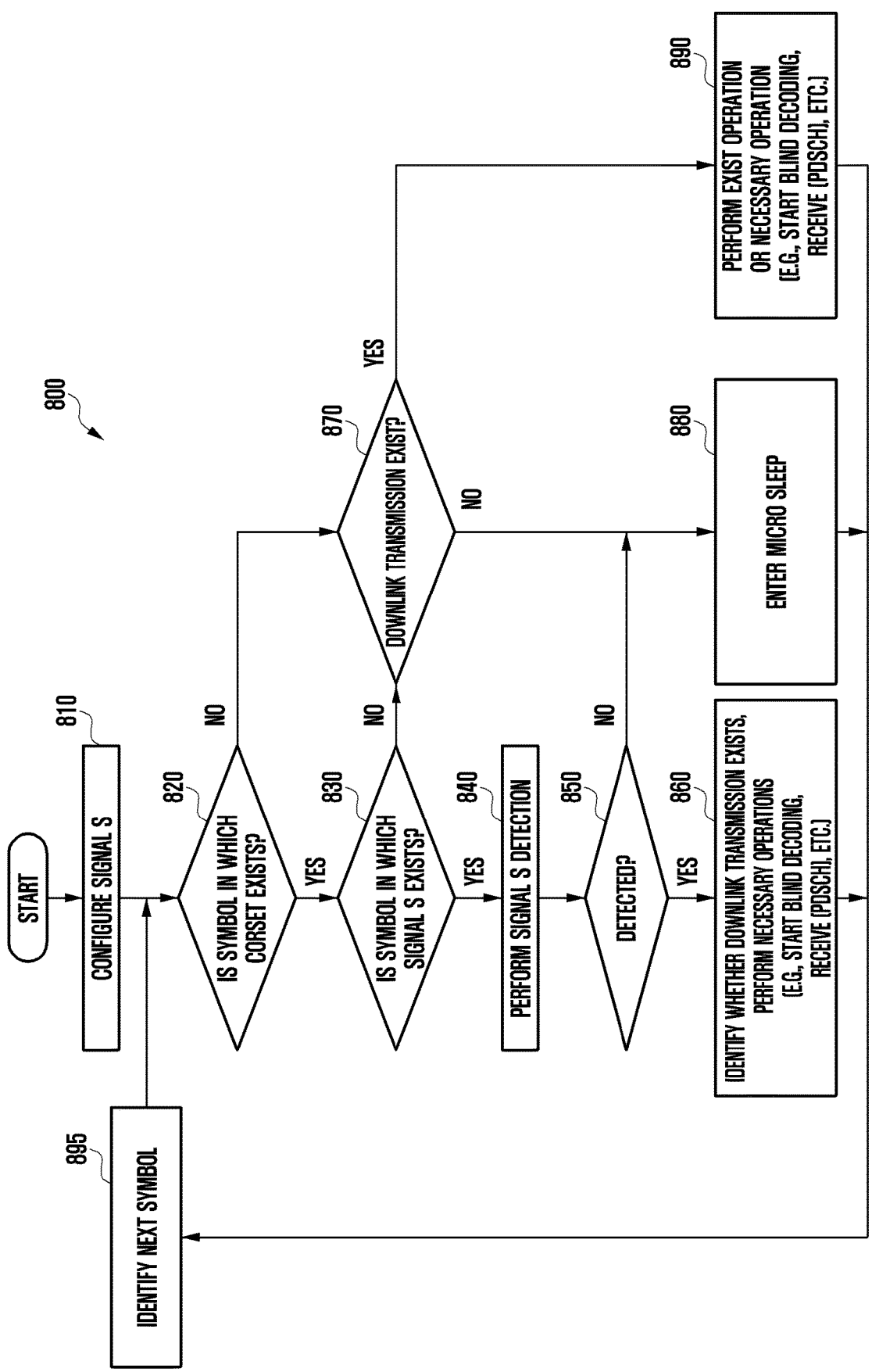
FIG. 8 is a flowchart illustrating a downlink transmission detection process of a terminal according to the proposed embodiment.

FIG. 8 is a flowchart illustrating a downlink transmission detection process of a terminal according to the proposed embodiment. In FIG. 8, the operation of the terminal according to an embodiment is shown according to a time series flow, and although the contents are not explicitly illustrated and described in FIG. 8, the embodiment described in FIGS. 1 to 7 may be used in the operation of the terminal in FIG. 8.

First, the signal s is configured according to the embodiment described in FIG. 7 prior to the terminal A (810). The terminal in which the signal s is configured determines whether a symbol in which a CORESET exists in a specific OFDM symbol (820). That is, since the terminal has to detect the downlink transmission by monitoring the search space set associated with the CORESET in the symbol where the CORESET exists, the terminal determines whether the CORESET exists (that is, transmitted) symbol. If a specific OFDM symbol is a symbol in which a CORESET exists (830), the terminal determines whether the signal s is transmitted in the corresponding symbol based on the configuration of the signal s. If the corresponding symbol is a symbol from which the signal s is transmitted, the terminal performs detection of the signal s from the corresponding symbol (840), and when the signal s is detected, the terminal may determine that downlink transmission exists in the BWP (850, 860). Accordingly, the terminal starts blind decoding of a downlink control channel or receives downlink data (e.g., a physical downlink shared channel (PDSCH)).

On the other hand, if the corresponding symbol is a symbol that does not have a CORESET (820), or the signal s is not a transmitted symbol even if a CORESET is present (830), and there is no downlink transmission in the corresponding symbol (870), the terminal may enter a micro sleep to minimize current consumption (880). At this time, if the signal s is a symbol that is not transmitted from the symbol where the CORESET is present, and if it is determined that there is downlink transmission, based on this, the predetermined operation may be continued or a new operation may be performed (890). For example, the terminal may continuously perform blind decoding in progress from the previous symbol or receive downlink data, based on the received control information.

Subsequent to the above-described various cases, the terminal identifies the next OFDM symbol (895) and repeats the process of identifying whether to transmit the CORESET and the signal s for the corresponding OFDM symbol.

Figure 9:
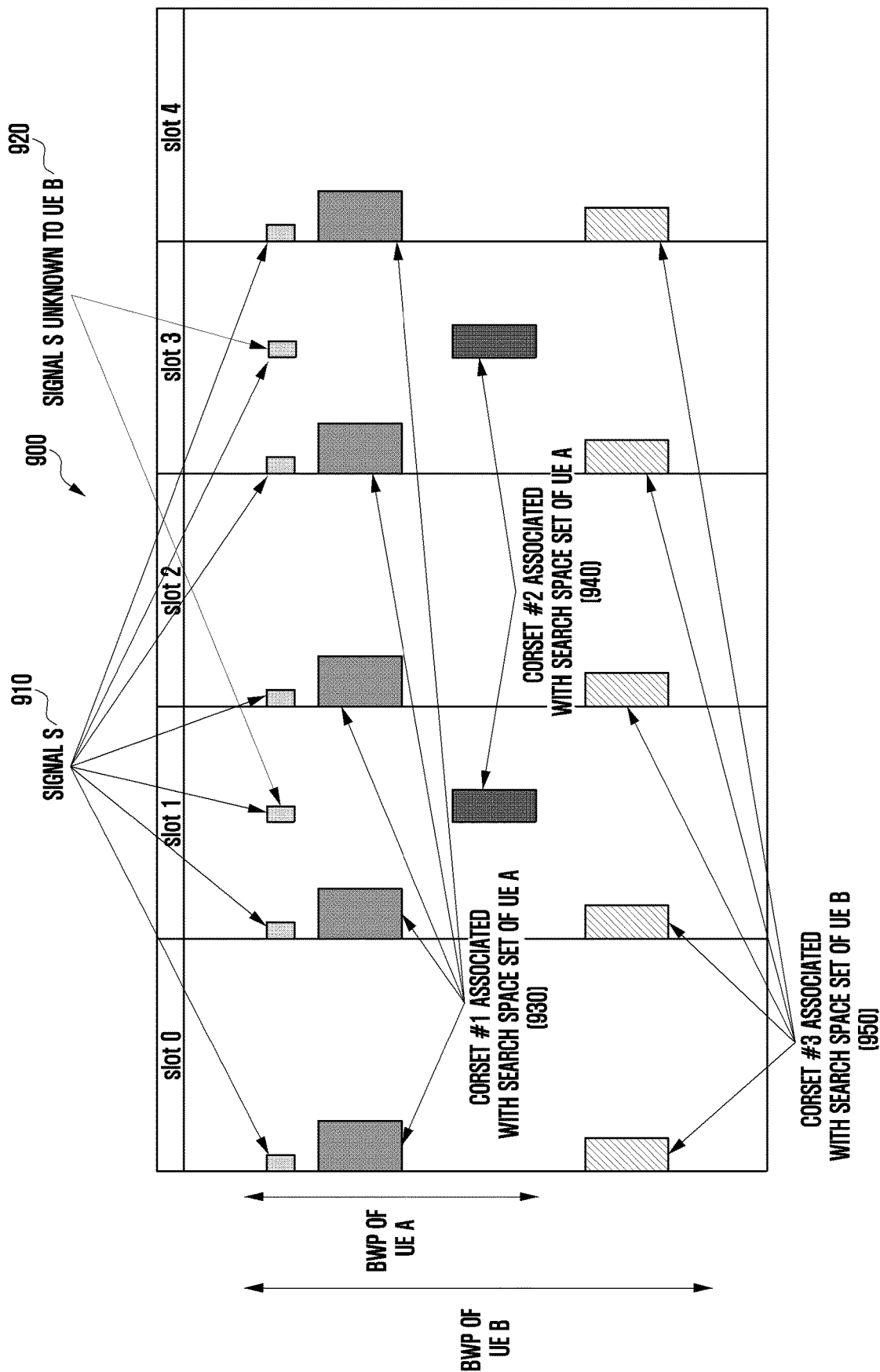
FIG. 9 is a view illustrating another example in which the signal s is configured according to the proposed embodiment.

FIG. 9 is a view illustrating another example in which the signal s is configured according to the proposed embodiment. FIG. 9 illustrates an embodiment in which the signal s is configured for the terminal A and the terminal B, unlike the embodiments described previously with reference to FIGS. 7 and 8.

In FIG. 9, a BWP is configured for the terminal A and a signal s can be specifically configured in the BWP (910). At this time, the position on the frequency axis of the signal s transmitted to the terminal A is in the BWP of the terminal A, and the position on the time axis of the signal s may be the first symbol of CORESET #1 930 and the first symbol of CORESET #2 940 associated with the search space set in the terminal A. Similarly, a separate BWP may be configured for the terminal B and a signal s may be specifically configured in the BWP. At this time, as described in FIG. 6, the signal s may be transmitted to the terminal A and the terminal B (910) by using the band on which the BWP of the terminal A and the BWP of the terminal B overlap as a position on the frequency axis (910).

In the case of FIG. 9, the terminal B cannot know whether to transmit some of the signal s transmitted to the terminal A (920). This is because, unlike CORESET #1 930, CORESET #2 940 is defined only for the terminal A on the time axis. If the terminal B does not know that some 920 of the signal s is transmitted, there is a possibility that decoding of the data received in the corresponding resource region might not be successfully performed. Accordingly, in order to solve this problem, information for notifying the existence of the signal s may be included together in the process of notifying the terminal of the configuration for the signal s. For example, when the signal s is configured, position information (slot position information and/or symbol position information, etc.) on the time axis of the signal s may be transmitted to the terminal together as configuration information for the signal s.

The terminal is able to know the location of all the signal s in its BWP by receiving information for configuring the signal s, and accordingly, if the downlink data (e.g., PDSCH) is transmitted to a location where the signal s not associated with the CORESET monitored by the terminal is transmitted, the terminal may perform rate matching in consideration of this.

As another method, the base station determines the location of the resource region in which the signal s 920 unknown to the specific terminal is transmitted as semi-static and transmits L1 signaling to the terminal in which the PDSCH is scheduled in the resource region, thereby allowing the corresponding terminal to PDSCH can be received without any problem. As another method, the terminal B is configured to monitor downlink control information (DCI) format 2_1, so that the terminal B can know that a specific resource region indicated by DCI format 2_1 transmitted through PDCCH is pre-empted.

Figure 10:
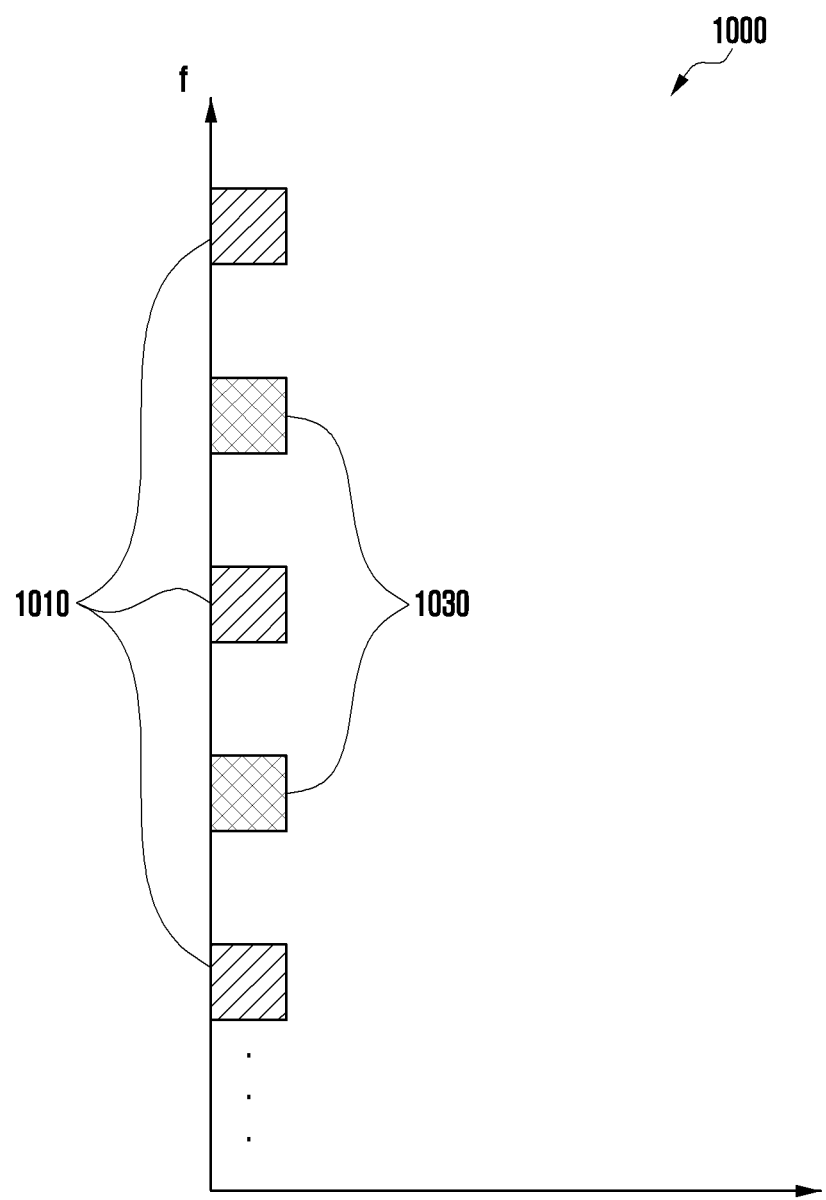
FIG. 10 is a view illustrating an example in which a signal s is mapped to a resource region according to the proposed embodiment.

FIG. 10 is a view illustrating an example in which a signal s is mapped to a resource region according to the proposed embodiment. FIGS. 7 and 9 illustrates, for the convenience of description, that only one signal s is transmitted at a specific frequency location in a specific symbol. However, the signal s may be configured to have an arbitrary pattern or density on the frequency axis according to the setting when transmitted on the first symbol of CORESET associated with a specific terminal.

FIG. 10 illustrates an example of a signal s having two different patterns (or densities). When the signal s is configured to have the narrowest interval on the frequency axis, the signal s may be transmitted at positions on the frequency axis corresponding to both 1010 and 1030 in FIG. 10. On the other hand, when the signal s is configured to have a relatively longer interval on the frequency axis, the signal s may be transmitted at a position on the frequency axis corresponding to 1010 or 1030 in FIG. 10. The distance on the frequency axis through which this signal s is transmitted can be defined as a pattern or density as described above.

The longer the distance between signals s on the frequency axis, the higher the efficiency of resource utilization, while the scheduling freedom of the base station within the entire system bandwidth decreases. Conversely, the shorter the distance between signals s, the lower the efficiency in terms of resource utilization. Accordingly, the base station can use the unlicensed band with optimum efficiency by configuring the pattern or density of the signal s in consideration of the network situation.

In the above-described embodiment, an arbitrary name of signal s is used, but a channel state information reference signal (CSI-RS) may be used as an example of the signal s described above. CSI-RS is a reference signal that is configured for a terminal using a plurality of parameters, and CSI-RS configuration parameters include various parameters such as CSI-IM-ResourceMapping, CSI-RS-FreqB and, and CSI-RS-timeConfig. In particular, in the case of the CSI-IM-ResourceMapping parameter, it indicates the position of the RS in a specific slot (for example, 0, 1, 2, . . . , 13 symbols) and the position of the subcarrier in the RB. Thus, the position of the resource region to which the previously proposed signal s is transmitted can be specified. In addition, in the case of the CSI-RS-FreqBand parameter, an index of an RB in which CSI-RS transmission starts on a frequency axis is indicated and allocated in a minimum of 4 RB units. Since the signal s is allocated in a smaller RB unit and the purpose can be achieved, it is possible to reduce the minimum number of transmitted signal s by using these parameters. The CSI-RS-timeconfig parameters indicates the period (for example, 5, 10, 20, 40, . . . , 640 slots) for which CSI-RS is configured, and the slot offset (0, . . . , P−1, P is CSI-RS configuration cycle). Since the minimum value of the CSI-RS setting period is at least 5 slots, in the case of CORESET having slot period 1 (e.g., CORESET #1 in FIGS. 7 and 9), the corresponding parameter can be applied by configuring a plurality of CSI-RSs. In addition, parameters such as scramblingID are allocated to the terminal-specifically as a value for configuring the NID of Equation 1 below, which is applied to CSI-RS sequence generation. The base station can make the terminals have the same sequence by configuring the parameters identically to the terminals in the serving cell to configure the cell-specific parameters. In Equation 1, ns means a slot index, and 1 means a symbol index.

$$c_{init}=(2^{10}*((14n_s+l+1)(2N_{ID}+1))+N_{ID})*\mod 2^{31}$$ [Equation 1]

When the parameters for CSI-RS configuration are used to configure the signal s as described above, various values such as the location, transmission period, and offset of the signal s in the resource region to be transmitted can be configured for the terminal according to the proposed embodiment. Accordingly, even if a new message or parameter is not defined, the operation of the proposed embodiment may be possible. Previously, CSI-RS-related parameters were proposed and described as examples, but other reference signals (e.g., phase tracking reference signal (PTRS), tracking reference signal (TRS), etc.)-related parameters can be utilized as much as possible. In addition, it is also possible to design and use a separate parameter for signal s in addition to the parameters related to the already existing signal.

In an embodiment, a case in which the proposed operation is applied in an EUTRAN-NR dual connectivity (ENDC) environment may be considered. That is, it is possible to consider an environment in which the DC is configured as a master enode B (MeNB) for the EUTRAN base station and as a secondary enode B (SeNB) for the NR base station, where the MeNB base station of the EUTRAN may be connected to the terminal through a licensed band, and the SeNB base station of the NR may be connected to the terminal through an unlicensed band. In this environment, the signal s described above is transmitted from the unlicensed band to the terminal through the SeNB, and the signal for configuring the signal s for this and/or the signal for configuring the signal s related parameter may be transmitted from the licensed band to the terminal through the MeNB.

Figure 11:
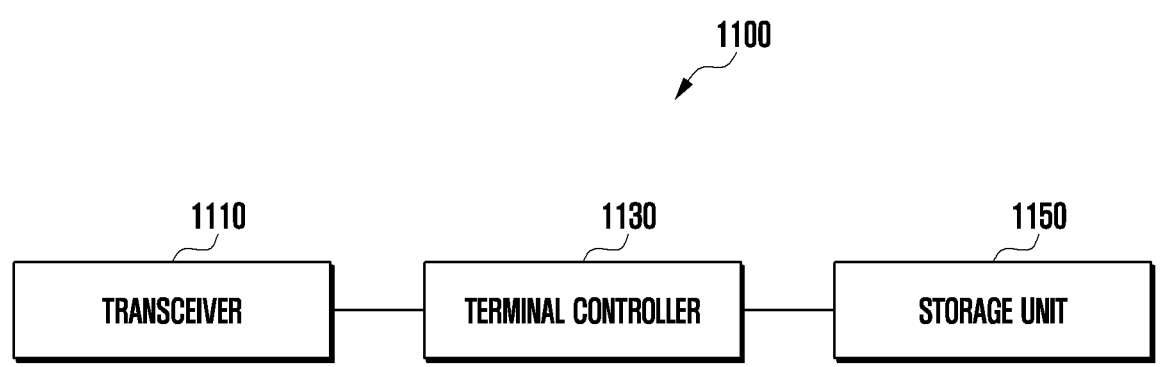
FIG. 11 is a view showing the structure of a terminal according to an embodiment of the disclosure.

FIG. 11 is a view illustrating the structure of a terminal according to an embodiment of the disclosure. Referring to FIG. 11, the terminal may include a transceiver 1110, a terminal controller 1130, and a storage unit 1150. The terminal controller 1130 in the disclosure may be defined as a circuit, an application-specific integrated circuit, or at least one processor.

The transceiver 1110 transmits and receives signals to and from other network entities. The transceiver 1110 may receive, for example, a downlink signal for beam measurement from a base station or transmit beam failure related information to the base station. The transceiver 1110 may be implemented in the form of an RF unit including a modem.

The terminal controller 1130 may control the overall operation of the terminal according to the embodiment proposed in the disclosure. For example, the terminal controller 1130 may control the transceiver 1110 and the storage unit 1150 to perform an operation according to the embodiment described in the previous drawings. Specifically, when the signal s is configured from the base station, the terminal controller 1130 may detect the signal s at a specific time point and determine whether to transmit the downlink signal.

The storage 1150 may store at least one of information transmitted and received through the transceiver 1110 and information generated through the terminal controller 1130.

Figure 12:
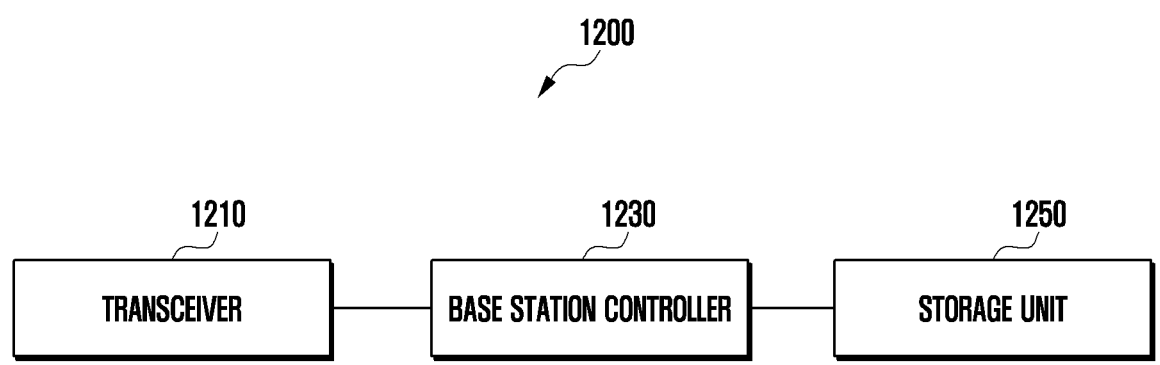
FIG. 12 is a view showing the structure of a base station according to an embodiment of the disclosure.

FIG. 12 is a view illustrating the structure of a base station according to an embodiment of the disclosure. Referring to FIG. 12, the base station may include a transceiver 1210, a base station controller 1230, and a storage unit 1250. The base station controller 1230 in the disclosure may be defined as a circuit, application-specific integrated circuit, or at least one processor.

The transceiver 1210 may transmit and receive signals with other network entities. The transceiver 1210 may transmit, for example, a downlink signal such as a reference signal, a synchronization signal, or a PDCCH for beam measurement to the terminal. The transceiver 1210 may be implemented in the form of an RF unit including a modem.

The base station controller 1230 may control the overall operation of the base station according to the embodiment proposed in the disclosure. For example, the base station controller 1230 may control the transceiver 1210 and the storage unit 1250 to perform an operation according to the embodiment described in the previous drawings. Specifically, the base station controller 1230 may configure and transmit a signal s for informing the terminal of the transmission of the downlink signal through the unlicensed band.

The storage unit 1250 may store at least one of information transmitted and received through the transceiver 1210 and information generated through the base station controller 1230.

Although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A method performed by a user equipment (UE) in a wireless communication system, the method comprising:
   receiving, from a base station, a radio resource control (RRC) message including configuration information for a UE-common signal and information indicating a control resource set (CORESET) associated with the UE-common signal;
   monitoring the UE-common signal on a physical downlink control channel (PDCCH) based on the configuration information;
   detecting the UE-common signal, and in response to detecting the UE-common signal, identifying that a downlink transmission is performed from a first symbol of a slot where the UE detects the UE-common signal; and performing a blind decoding for downlink control information (DCI) in a search space of the CORESET associated with the UE-common signal.

2. The method of claim 1, wherein the UE-common signal is frequency duplex multiplexed (FDMed) with a first symbol of one or more symbols corresponding to the CORESET and is received in a bandwidth part (BWP) allocated to the UE on a frequency axis.

3. The method of claim 1, wherein the UE-common signal is time duplex multiplexed (TDMed) with the CORESET in one of a plurality of subcarriers corresponding to the CORESET.

4. The method of claim 1, wherein the configuration information includes information on at least one of a position on a frequency axis where the UE-common signal is received, or a cycle on a time axis where the UE-common signal is received, and
in case that the UE-common signal is not detected, the UE operates in a sleep mode.

5. A user equipment (UE) in a wireless communication system, the UE comprising:
a transceiver configured to transmit and receive a signal; and
a controller configured to:
receive, from a base station, a radio resource control (RRC) message including configuration information for a UE-common signal and information indicating a control resource set (CORESET) associated with the UE-common signal,
monitor the UE-common signal on a physical downlink control channel (PDCCH) based on the configuration information,
in case that the UE-common signal is detected, identify that a downlink transmission is performed from a first symbol of a slot where the UE detects the UE-common signal, and
perform a blind decoding for downlink control information (DCI) in a search space of the CORESET associated with the UE-common signal.

6. The UE of claim 5, wherein the UE common signal is frequency duplex multiplexed (FDMed) with a first symbol of the one or more symbols corresponding to the CORESET and is received in a bandwidth part (BWP) allocated to the UE on a frequency axis.

7. The UE of claim 5, wherein the UE common signal is time duplex multiplexed (TDMed) with the CORESET in one of a plurality of subcarriers corresponding to the CORESET.

8. The UE of claim 5, wherein the configuration information includes information on at least one of a position on a frequency axis where the UE-common signal is received, or a cycle on the time axis where the UE-common signal is received, and
in case that the UE-common is not detected, the UE operates in a sleep mode.

9. A method performed by a base station in a wireless communication system, the method comprising:
transmitting, to a user equipment (UE), a radio resource control (RRC) message including configuration information for a UE-common signal and information indicating a control resource set (CORESET) associated with the UE-common signal; and transmitting, to the UE, the UE-common signal on a physical downlink control channel (PDCCH) based on the configuration information,
identifying that a downlink transmission is performed from a first symbol of a slot where the UE-common signal is transmitted, and
transmitting, to the UE, downlink control information (DCI) in a search space of the CORESET associated with the UE-common signal.

10. The method of claim 9, wherein the UE-common signal is frequency duplex multiplexed (FDMed) with a first symbol of the one or more symbols corresponding to the CORESET and is transmitted in a bandwidth part (BWP) allocated to the UE on a frequency axis.

11. The method of claim 9, wherein the UE-common signal is time duplex multiplexed (TDMed) with the CORESET in one of a plurality of subcarriers corresponding to the CORESET, and
wherein the configuration information includes information on at least one of a position on a frequency axis where the UE-common signal is transmitted, or a cycle on the time axis where the UE common signal is transmitted, and
in case that the UE-common signal is not detected, the UE operates in a sleep mode.

12. A base station in a wireless communication system, the base station comprising:
a transceiver configured to transmit and receive a signal; and
a controller configured to:
transmit, to a user equipment (UE), a radio resource control (RRC) message including configuration information for a UE-common signal and information indicating a control resource set (CORESET) associated with the UE-common signal, and
transmit, to the UE, the UE-common signal on a physical downlink control channel (PDCCH) based on the configuration information,
identify that a downlink transmission is performed from a first symbol of a slot where the UE-common signal is transmitted, and
transmit, to the UE, downlink control information (DCI) in a search space of the OCRESET associated with the UE-common signal.

13. The base station of claim 12, wherein the UE common signal is frequency duplex multiplexed (FDMed) with a first symbol of the one or more symbols corresponding to the CORESET, and is transmitted in a bandwidth part (BWP) allocated to the UE on a frequency axis.

14. The base station of claim 12, wherein the UE common signal is time duplex multiplexed (TDMed) with the CORESET in one of a plurality of subcarriers corresponding to the CORESET.

15. The base station of claim 12, wherein the configuration information includes information on at least one of a position on a frequency axis where the UE-common signal is transmitted, or a cycle on the time axis where the UE-common signal is transmitted, and
in case that the UE-common signal is not detected, the UE operates in a sleep mode.

* * * * *